United States Patent [19]

Frihart

[11] Patent Number: 4,665,225

[45] Date of Patent: May 12, 1987

[54] CYCLOALIPHATIC AMINO CARBOXYLIC ACID

[75] Inventor: Charles R. Frihart, Lawrenceville, N.J.

[73] Assignee: Union Camp Corporation, Wayne, N.J.

[21] Appl. No.: 775,371

[22] Filed: Sep. 12, 1985

[51] Int. Cl.$^4$ .................. C07C 101/04; C07C 103/52
[52] U.S. Cl. .................................. 562/507; 528/327; 528/329.1; 528/330; 528/339.3; 562/510

[58] Field of Search ................ 562/507, 510; 528/330, 528/310

[56] References Cited

U.S. PATENT DOCUMENTS 3,711,537  1/1973  Asano et al. .................. 528/330

Primary Examiner—Harold D. Anderson
Attorney, Agent, or Firm—Kane, Dalsimer, Kane, Sullivan and Kurucz

[57] ABSTRACT

A $C_{21}$ amino acid is disclosed as a useful reactant for preparing polyamide resins.

3 Claims, No Drawings

CYCLOALIPHATIC AMINO CARBOXYLIC ACID

BACKGROUND OF THE INVENTION

Field of the Invention

The invention relates to amino acids and more particularly relates to a novel class of $C_{21}$ amino acids and polyamide resin derivatives.

SUMMARY OF THE INVENTION

The invention comprises compounds of the formulae:

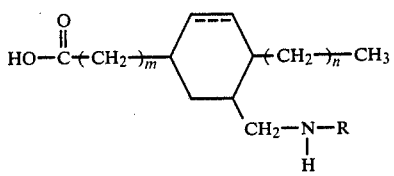

(I)

and

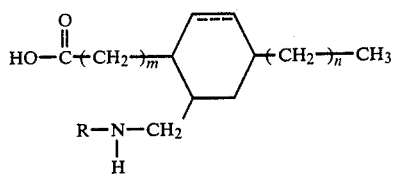

(II)

and acid addition salts thereof, wherein the broken line indicates that a double bond may or may not be present; R represents one of hydrogen and acyl, m and n are each whole number integers of 0 to 12 and the sum of m+n equals twelve.

The compounds (I and II) of the invention are useful as surface active agents and also are useful reactants for the preparation of polyamide resins. The resins have utility, for example, as hot-melt adhesives, epoxy curing agents, structural plastics, and like uses.

The invention also comprises the polymeric resins derived from the compounds of the invention.

DETAILED DESCRIPTION OF THE INVENTION

The compounds (I) of the invention wherein R represents hydrogen may be prepared by reducing the corresponding nitrile of formulae:

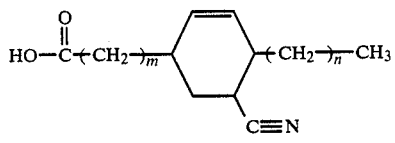

(III)

or

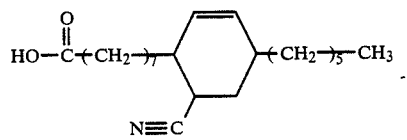

(IV)

The nitriles of formulae (III and IV) above are well known compounds as are their preparation; see for example Teeter et al., JOC, 22, pg. 512 (1957).

The reduction of the nitriles (III and IV) may be carried out by hydrogenation employing conventional hydrogenation apparatus. The double bond in the compounds (III and IV) is readily reduced by hydrogenation in the presence of a hydrogenation catalyst such as 10 percent palladium-on-carbon under relatively mild temperature and pressure conditions, i.e., at temperatures within the range of room temperature to 150° C. or higher and under pressures of 100 to 400 or higher PSIG.

Reduction of the nitrile group on the compounds (III and IV) requires slightly different hydrogenation conditions. Employing Raney-nickel as the catalyst and a solvent such as acetic acid, the nitrile group is readily reduced at temperatures of from about 100° C. to 250° C. under pressures of from about 400 to 4000 PSIG within a period of about 1 to 10 hours. Under these conditions alone, some of the double bonds are also reduced, giving a mixture of saturated and unsaturated compounds of the invention having the formulae (I) and (II) above with the A group being an acetyl group. Mixtures of the saturated and unsaturated compounds (I) and (II) are useful as described above or the isomers may be separated by distillation for separate uses.

Progress of the hydrogenations may be followed by conventional analytical techniques such as iodine values and infrared spectroscopy to determine completion of the reductions. In general, the hydrogenations are complete within 1 to 10 hours depending on the reaction temperatures and pressures employed.

Compounds of the invention having the formula (I) and (II) given above wherein R represents acyl may be prepared by acylation of the corresponding compound (I) wherein R is hydrogen, or by doing the reduction under high temperatures (about 100° C.) using an organic carboxylic acid as the solvent.

The term "acyl" as used throughout the specification and the claims means the monovalent moiety of formula:

(V)

which is an acyl radical of a carboxylic acid, advantageously a hydrocarbon carboxylic acid acyl of not more than 18 carbon atoms; or a halo-, nitro-, hydroxy-, amino-, cyano-, thiocyano-, or lower alkoxy-substituted hydrocarbon acyl radical advantageously of not more than 18 carbon atoms. Representative are the acyl radicals of the following acids:

(a) saturated or unsaturated, straight or branched chain aliphatic carboxylic acids, for example acetic, propionic, valeric, isovaleric, caproic, succinic, dodecanoic, palmitic, stearic, acrylic, crotonic, undecylenic, oleic, hexynoic, heptynoic, octynoic acids, and the like;

(b) saturated or unsaturated, alicyclic carboxylic acids, for example, cyclobutanecarboxylic acid, cyclopentanecarboxylic acid, methylcyclopentenecarboxylic acid, cyclohexanecarboxylic acid, dimethylcyclohexenecarboxylic acid, dipropylcyclohexanecarboxylic acid, and the like;

(c) saturated or unsaturated, alicyclic aliphatic carboxylic acids, for example cyclopentanepropionic acid cyclohexanebutyric acid and the like;

(d) aromatic carboxylic acids, for example, benzoic acid, toluic acid, naphthoic acid, ethylbenzoic acid, isobutyl-benzoic acid, methylbutylbenzoic acid, and the like; and (e) aromatic-aliphatic carboxylic acids, for example, phenylacetic acid, phenylpropionic acid, phenylvaleric acid, cinnamic acid and the like. Suitable halo-, nitro-, hydroxy-, amino-, cyano-, thio-, cyano-, and lower alkoxyhydrocarbon carboxylic acids include hydrocarbon carboxylic acids as given above which are substituted by one or more of halogen, nitro, hydroxy, amino, cyano, or thiocyano, or lower-alkoxy, advantageously lower-alkoxy of not more than 18 carbon atoms, for example, methoxy, ethoxy, propoxy, butoxy, amyloxy, hexyloxy, and isomeric forms thereof. Examples of such substituted hydrocarbon carboxylic acids are mono-, di-, and trichloracetic acid;
mevalonic acid;
shikimic acid;
anisic acid;
salicylic acid;
o-, m-, and p-nitrobenzoic acid;
cyanoacetic acid;
thiocyanoacetic acid;
lactic acid;
ethoxyformic acid (ethyl hydrogen carbonate);
butyloxyformic acid;
pentyloxyformic acid;
hexyloxyformic acid;
dodecyloxyformic acid;
hexadecyloxyformic acid; and the like.

Alternatively the acid anhydrides, where available, may be used to acylate the compounds (I) and (II) of the invention.

Acylation of the compound of formula (I) wherein R is hydrogen may be carried out advantageously with an acylating agent such as an acyl halide of the formula:

$$R'-\overset{O}{\underset{\|}{C}}-Z \qquad (VI)$$

wherein Z represents halogen such as chlorine, bromine and iodine and the moiety of formula (V) is as described above. The acylation is advantageously carried out by admixture of the acylating halide or anhydride with the compound (I) in the presence of an acid binding agent, for example a tertiary amine. Illustrative of tertiary amines which may be used are pyridine, quinoline, trimethylamine, triethylamine and the like. Advantageously the acylation is carried out in the presence of an inert solvent, i.e., a solvent for the acylating agent which does not interfere with or alter the desired course of the acylation. Representative of such inert solvents are chloroform, diethyl ether, dimethylformamide and the like.

The compounds (I) and (II) wherein R is acyl may be converted to the compounds (I) and (II) wherein R is hydrogen by hydrolysis, using conventional and known techniques, such as caustic saponification followed by neutralization or acid hydrolysis followed by neutralization.

The acid addition salts of the compounds of formulae (I) and (II) are prepared by reacting the free base (I) and (II) with a stoichiometric proportion of an appropriate acid such as hydrochloric acid. The method is well known to those skilled in the art and may be carried out in aqueous or non-aqueous media such as ethanol, ether, ethyl acetate and the like. Illustrative of acid addition salts are those formed upon reacting a compound of the formulae (I) and (II) of the invention with hydrochloric acid, hydrobromic acid, sulfuric acid, phosphoric acid, acetic acid, lactic acid, citric acid, succinic acid, benzoic acid, salicylic acid and the like.

The acid addition salts are useful for the same purposes and in the same manner as the free base compounds of the formulae (I) and (II).

The compounds (I) and (II) when R is either hydrogen or an acyl group can be polymerized by heating with removal of either the water or acetic acid. This process can be aided by the addition of an amidification catalyst which may be an inorganic acid, such as phosphoric acid, sulfuric acid, hydrochloric acid and the like or a strong organic acid, such as p-toluenesulfonic acid, trifluoromethanesulfonic acid, naphthalenesulfonic acid and the like, or an inorganic compound, such as dibutyl tin oxide, tin oxalate, tetraisopropyl titanate, and the like. The temperature for this reaction can be from 150° to 300° C.

In addition compounds (I) and (III) may be used to modify other known polyamide formulations. This includes using this coumpound with polyamide hot-melt adhesives, such as those containing polymerized fatty acids, $C_6$–$C_{20}$ linear dicarboxylic acids, and diamines, such as ethylene diamine, hexamethylene diamine, piperazine, ether diamines, and the like and polyalkylpolyamines, such as diethyltriamine, triethyltetraamine, tetraethylpentaamine and the like. The compounds may also be used to modify the properties of structural polyamides by incorporation into the chains of Nylon 6, Nylon 6,6, Nylon 6,10, Nylon 10,10, Nylon 6,12, Nylon 4,6, and the like.

The following preparations and examples describe the manner and process of making and using the invention and set forth the best mode contemplated by the inventors but are not to be considered as limiting. All parts specified are by weight unless otherwise stated.

PREPARATION 1

A suitable vessel is charged with 100 parts of Unitol BKS* and 0.15 parts of iodine. The charge is then heated to a temperature of 250° C. for 1 hour. At the end of this period, the reaction mixture is allowed to cool to 200° C. and 44 parts of acrylonitrile is added. The temperature is maintained at 200° C. for 1 hour and then the reaction mixture is allowed to cool to ambient temperature. The reaction mixture (940 g) is suspended in 1.5 l of water and warmed to 65° C. with mechanical stirring for 1 hour. The mixture is transferred to a separatory funnel and the organic phase is removed. This washing process is repeated three times to ensure that any unreacted acrylonitrile is removed. The organic phase is dissolved in 1.5 g toluene, dried with (MgSO$_4$) and the toluene evaporated to give a brown oil (908.6 g; 96% recovery). The oil, which contains unreacted fatty acids $C_{21}$-nitrile and polymeric material, is subjected to vacuum distillation, using a short-path distillation head. The pure nitrile, which is obtained after removal of the monomer fraction (150°–240° C.; 1.5 mm Hg) is distilled at 260°–275° C. under a pressure of 1.0–0.8 mm Hg as a viscous, yellow liquid.

*A tall oil mixture of fatty acids containing 31.2 percent by weight of linoleic acid; Union Camp Corporation, Wayne, N.J.

PREPARATION 2

The procedure of preparation 1, supra, was repeated except that the crude reaction mixture was placed under a vacuum to remove any excess acrylonitrile and then subjected to a similar short-path distillation to give the same nitrile product.

PREPARATION 3

The procedure of preparation 1, supra., was repeated except that linoleic acid, Pamolyn 200*, and 113 parts of acrylonitrile were used.

*A linoleic acid containing 70% linoleic and 11% conjugated linoleic acid by weight; Hercules Corporation, Wilmington, Del.

PREPARATION 4

The procedure of preparation 1, supra, was repeated except that conjugated linoleic acid, Pamolyn 380**, and 113 parts of acrylonitrile were used.

** A conjugated linoleic acid containing 21% linoleic acid and 60% conjugated linoleic acid by weight; Hercules Corporation, Wilmington, Del.

EXAMPLE 1

A Parr pressure vessel is charged with 25 parts of the nitrile prepared in accordance with Preparation 1, supra., 3.4 parts of Roney nickel, 12 parts sodium acetate and 150 parts of acetic acid. The reaction is purged five times with nitrogen and then three times with hydrogen. The reactor is then pressurized to 400 psig and heated to 150° C. After five hours, the pressure was released and the reactor purged three times with nitrogen. The solution was filtered to remove the catalyst. The product was dissolved in 200 parts of ether and extracted three times with 100 parts of water. After drying over magnesium sulfate, the ether was stripped off to yield the mixture of compounds of formulae (I) and (II) where R=acetyl and some of the olefinic bonds were hydrogenated.

EXAMPLE 2

The procedure of example 1, supra, was repeated except that the reaction was run at 1,800 psig of hydrogen. This process yielded the mixture of compounds of formulae (I) and (II) where R=acetyl and the product was completely saturated.

EXAMPLE 3

A homopolymerization was carried out by charging the acid-amide (75 g) of Example 2, supra., into a 200 ml resin kettle with an 85% phosphoric acid as catalyst. The kettle was heated slowly to a temperature of 180°–200° C. while distillate (15.4 ml) was removed. The system was then run under vacuum (1 mm of Hg) maintaining the temperature (220° C.) for three hours. The product obtained was a sticky, brown material having a softening point of 35°–52° C., an acid number of 4.3 and an amine number of 12.3. The homopolymer is useful as an adhesive.

EXAMPLE 4

A base polyamide polymer used was prepared from polymerized fatty acid (Dimer-14, Union Camp Corporation) sebacic acid, ethylene diamine and piperazine in a molar ratio of 1:1:0.7:1.3 respectively. The product polyamide of this mixture has a softening point of 160°

C. After the acid amide of Example 2, supra., was added to the base polymer components at a 25% weight proportion, the mixture was heat treated under conditions identical to those used in the preparation of the homopolymer in Example 3, supra.

The polyamide product obtained had the following physical characteristics:

| | |
|---|---|
| Softening point = | 96–106° C. (Avg. = 101° C.) |
| Amine No. = | 2.2 |
| Acid No. = | 6.8 |
| Tg = | 2° C. |
| Viscosity = | 3900 cps |

The product polyamide resin is useful as an adhesive.

What is claimed is:

1. A compound selected from those of the formulae:

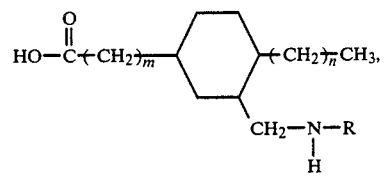

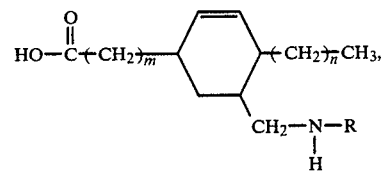

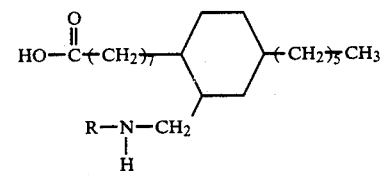

or

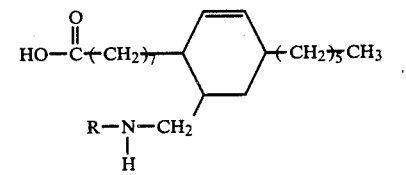

and acid addition salts thereof, wherein R represents one of hydrogen or acyl, m and n are each whole number integers of 0 to 12 and the sum of m+n equals 12.

2. The compound of claim 1 wherein R is hydrogen.

3. The compound of claim 1 wherein R is the acyl radical of acetic acid.

* * * * *